Patented Sept. 29, 1936

2,055,607

UNITED STATES PATENT OFFICE 2,055,607

TRI-ARYL-METHANE DYES

Frank William Linch and Herbert Holroyd Stocks, Blackley, Manchester, England, assignors to Imperial Chemical Industries Limited, a corporation of Great Britain No Drawing. Application August 7, 1935, Serial No. 35,042. In Great Britain August 16, 1934

4 Claims. (Cl. 260—67)

This invention relates to the manufacture of new dyestuffs, in particular to new tri-aryl-methane dyestuffs. It especially contemplates a new series of tri-phenyl-methane dyestuffs which dye animal fibers in clear shades of very good fastness to light.

The dyes of the tri-aryl-methane series which are characterized by their dyeing power and the clearness of their dyeings have the great disadvantage that they are comparatively fugitive to light. Dyes of this series in which there is a diphenyl-amine residue are somewhat better in respect to this property (light fastness).

It is known that the tri-aryl-methane dyestuffs containing a diphenyl-amine nucleus substituted in the 4' position by an alkoxy group possess light fastness properties superior to those normally possessed by tri-aryl-methane dyestuffs.

It has now been found that introducing into position (4') a beta-oxy-ethoxy group yields dyestuffs which dye animal fibers from an acid bath in shades of excellent fastness to light.

This invention had for an object the preparation of new tri-aryl-methane dyes and new processes for their production. Other objects were the preparation of such compounds in a very desirable physical form and in a high state of purity. A general advance in the art and other objects which will appear hereinafter are also contemplated.

The foregoing objects and related ends are accomplished in a manner set forth in the following description in which details of what is believed to be the best mode for carrying out the invention are disclosed.

The new dyes are sulfonic acid derivatives (existing either as free acids or alkali metal salts thereof) of compounds having the general formula:

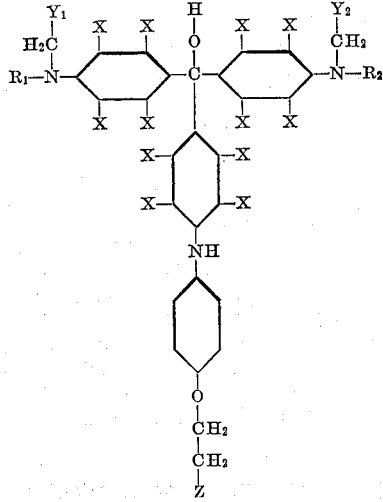

in which $R_1$, $R_2$, $Y_1$, $Y_2$ and X stand for univalent radicals and Z stands for an oxy radical, residue, substituent, group or nucleus. Compounds in which $R_1$ and $R_2$ are alkyl and $Y_1$ and $Y_2$ aryl, are especially interesting.

Specifically, one method for accomplishing the aforementioned objects and obtaining the newly discovered products is to introduce into the dyestuff molecule a beta-oxy-ethoxy group.

Introduction of a beta-alkoxy-ethoxy group into the dyestuff may be effected by either condensing para-amino-phenyl-beta-alkoxy-ethyl ether with a triphenyl-methane dyestuff derived from a benzaldehyde having a replaceable para-substituent, for example —$NO_2$, or —$SO_3H$ (see U. S. P. 1,582,909) or reacting a diphenylamine substituted in the para position by an alkoxy-ethoxy group with one molecular proportion of a tetra-alkyl-diamino-benzophenone, e. g. Michler's ketone.

Introduction of a beta-hydroxy-ethoxy group into the dyestuff may be effected by reacting para-amino-phenyl-beta-hydroxy-ethyl ether with a tri-aryl-methane dyestuff derived from a benzaldehyde having a reactive para substituent, for example —$SO_3H$ or —Cl, or by reacting a diphenylamine, carrying a beta-hydroxy-ethoxy group in the 4' position, with a tetra-alkyl-diamino-benzophenone such as e. g. Michler's ketone.

The invention will be further understood by a consideration of the following detailed description and illustrative specific examples in which the parts are given by weight.

Example I

Fifteen (15) parts of light green SF yellowish (Colour Index No. 670, Schultz (VII) 765), probably having the formula:

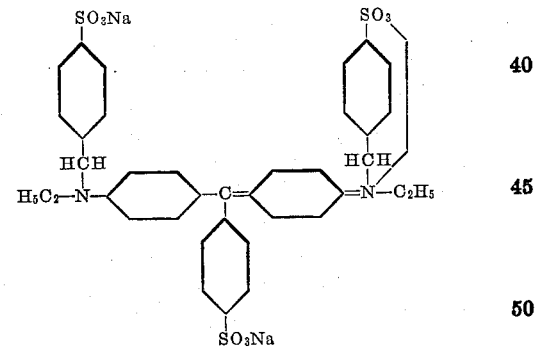

were heated for 4–6 hours at 125°–130° C. with 30 parts of para-amino-phenyl-beta-ethoxy-ethyl-ether probably having the formula:

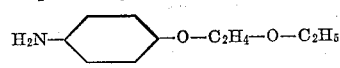

in presence of 1.5 parts of aqueous hydrochloric acid (S. G. 1.15) until the green tint of the melt changed to pure blue.

The excess of para-amino-phenyl-beta-ethoxy-ethyl ether was removed by extraction with dilute aqueous hydrochloric acid solution. The dyestuff remained behind as a finely divided precipitate, which was coagulated by warming to about 70° C. The mother liquor was decanted off after cooling. The new free acid dyestuff was dissolved in dilute aqueous sodium acetate solution and salted out in the form of its sodium salt. The dyestuff dyes wool in clear blue tints of very good fastness to light. In the form of a free acid the new dye probably has the formula:

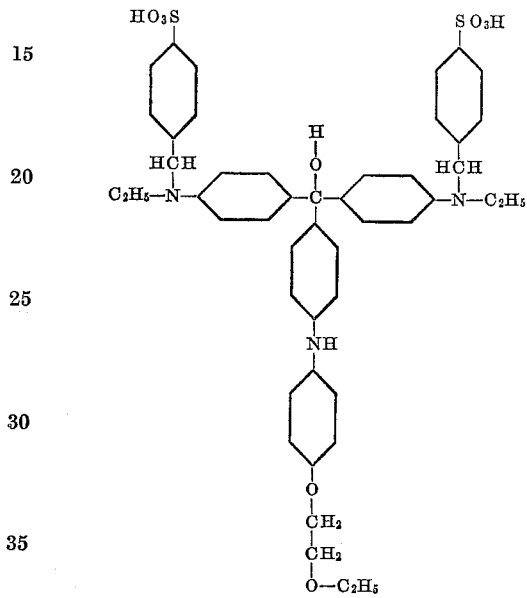

*Example II*

Thirty (30) parts of the dyestuff of the following constitution:

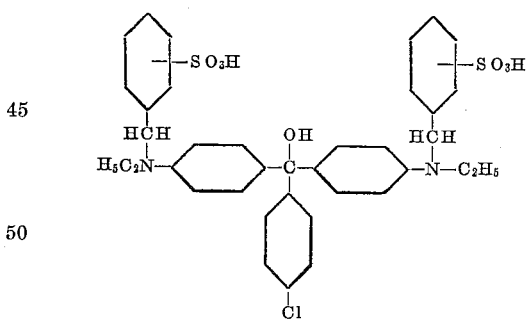

(prepared by condensing 1 molecular proportion of para-chloro-benzaldehyde with 2 molecular proportions of benzyl-ethyl-aniline sulfonic acid and oxidizing the resulting leuco compound in the usual manner), were heated at 125°–130° C. with 100 parts of para-aminophenyl-beta-hydroxy-ethyl ether, probably having the formula:

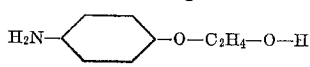

until the green tint of the melt changed to a pure blue (approximately 5–6 hours).

The excess of the para-amino-phenyl-beta-hydroxy-ethyl ether was removed by extracting the melt with dilute aqueous hydrochloric acid solution.

The residue of the new free acid dyestuff was dissolved in hot water and salted out by the addition of common salt. The new dyestuff dyes wool in clear blue tints of very good fastness to light. In the form of a free acid the new dye probably has the formula:

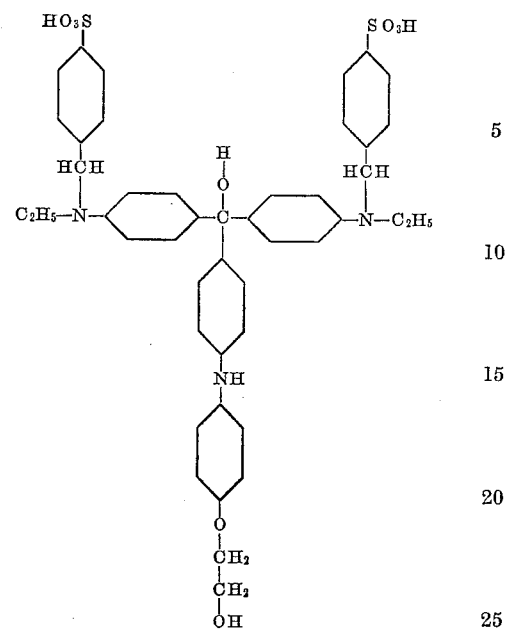

*Example III*

In a similar manner, a beta-methoxy-ethoxy group was introduced into a tri-aryl-methane dyestuff by condensing the dyestuff having the formula:

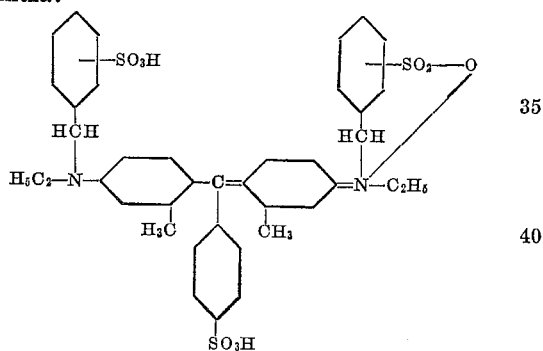

(see German Patent 287,003 and U. S. P. 1,218,-232) with para-amino-phenyl-beta-methoxy-ethyl ether.

*Example IV*

The dye resulting from para-nitro-benzaldehyde and ethyl-benzyl-aniline sulfonic acid (German Patent 292,998) was condensed with para-amino-phenyl-beta-butoxy-ethyl ether in the manner described above.

Within the scope of the general formulas set out above, other dyes can be used as starting materials as will be clear to those skilled in the art. In like manner, other bases may be used for the introduction of the beta-oxy-ethoxy-group into the final dyestuff.

The chemistry of this class of dyestuff is well understood in the art and variations in procedural matters are permissible without departing from the scope of the invention as would be expected of those having knowledge of this field.

The dyes in which, in the general formula, $R_1$ and $R_2$ represent ethyl groups and $Y_1$ and $Y_2$ represent phenyl groups, merit special mention.

When the new dyes are prepared from a tetra-alkyl-di-amino-benzo-phenone (for example, Michler's ketone) the resultant basic dye may be sulfonated in the usual manner.

The dyes of this invention may occur as the potassium, ammonium or other alkali metal salt as indicated above.

The new dyes obtainable by this invention are easily soluble in water and dye wool blue tints of good fastness to light from a feebly acid bath.

The new dyes may exist in any of the well known forms for dyes of this series, for example, as the free sulfonic acids, the alkali metal salts of the free sulfonic acids and either as a leuco base or in the oxidized form of the dye.

As many apparently widely different embodiments of this invention may be made without departing from the spirit and scope thereof, it is to be understood that we do not limit ourselves to the specific embodiments thereof except as defined in the appended claims.

We claim:

1. The new tri-aryl-methane dyes easily soluble in water and dyeing wool blue tints of good fastness to light from a feebly acid bath, these dyes being sulfonic acid derivatives of compounds having the general formula:

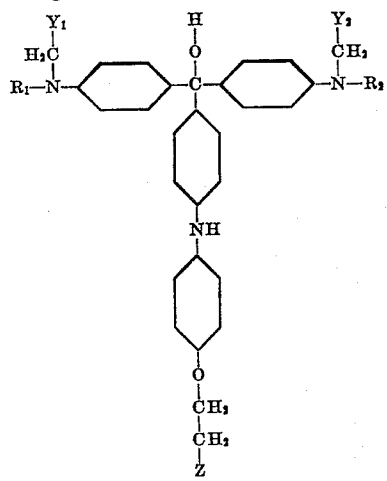

in which $R_1$ and $R_2$ represent alkyl, $Y_1$ and $Y_2$ represent aryl and Z stands for a radical from the group consisting of hydrogen and alkyl.

2. The new tri-aryl-methane dyes easily soluble in water and dyeing wool from a feebly acid bath clear blue tints of good fastness to light, the said dye, when in the form of a free acid, having the formula:

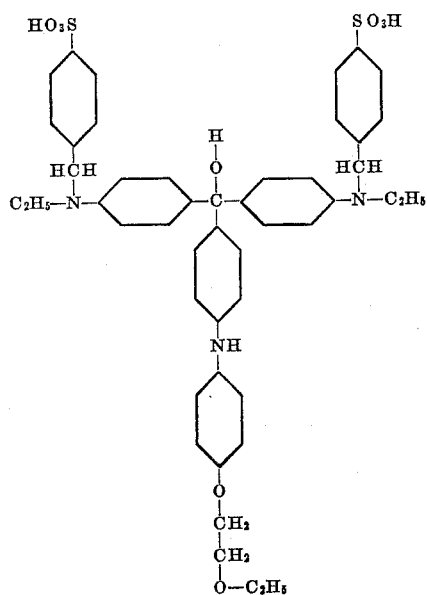

3. The new tri-aryl-methane dyes easily soluble in water and dyeing wool from a feebly acid bath clear blue tints of good fastness to light, the said dye, when in the form of a free acid, having the formula:

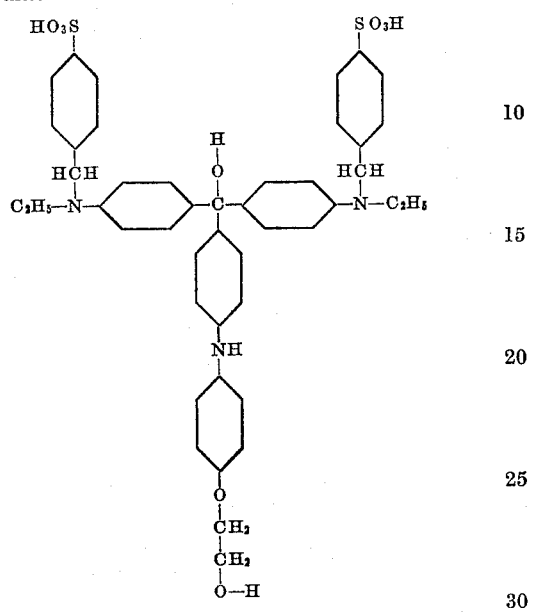

4. The new tri-aryl-methane dyes easily soluble in water and dyeing wool from a feebly acid bath clear blue tints of good fastness to light, the said dye, when in the form of a free acid, having the formula:

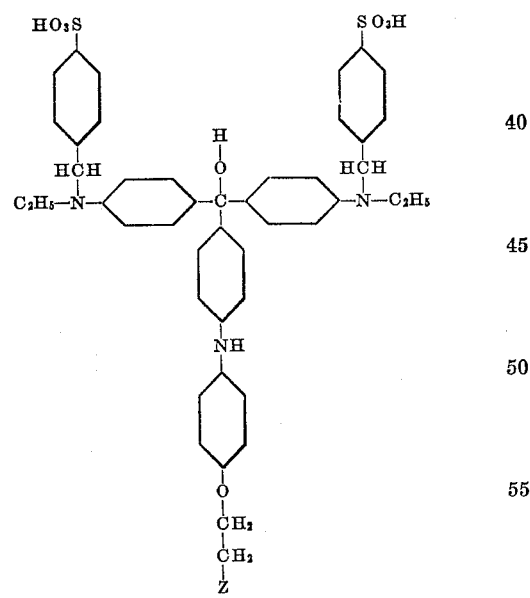

in which Z represents a member of the group consisting of O-hydrogen and O-alkyl.

FRANK WILLIAM LINCH.
HERBERT HOLROYD STOCKS.